(No Model.)

3 Sheets—Sheet 1.

G. W. VAN TINE.
MOLDING PRESS.

No. 569,691.   Patented Oct. 20, 1896.

WITNESSES:

INVENTOR:
George W. Van Tine,
BY
ATTORNEY.

(No Model.)   3 Sheets—Sheet 2.

G. W. VAN TINE.
MOLDING PRESS.

No. 569,691.   Patented Oct. 20, 1896.

WITNESSES:

INVENTOR:
George W. Van Tine
BY Henry Calver
ATTORNEY.

(No Model.)

3 Sheets—Sheet 3.

G. W. VAN TINE.
MOLDING PRESS.

No. 569,691.

Patented Oct. 20, 1896.

WITNESSES:

INVENTOR:
George W. Van Tine
BY
Henry Calver
ATTORNEY.

UNITED STATES PATENT OFFICE.

GEORGE W. VAN TINE, OF BAYONNE, NEW JERSEY.

MOLDING-PRESS.

SPECIFICATION forming part of Letters Patent No. 569,691, dated October 20, 1896.

Application filed April 18, 1894. Serial No. 508,038. (No model.)

*To all whom it may concern:*

Be it known that I, GEORGE W. VAN TINE, a citizen of the United States, residing at Bayonne, in the county of Hudson and State of New Jersey, have invented certain new and useful Improvements in Molding-Presses, of which the following is a specification, reference being had therein to the accompanying drawings.

My invention relates to that class of molding-presses employing sand-boxes which are furnished with pressure devices or blocks and pattern and stripping plates vertically movable in said boxes; and my invention has for its object, first, to provide a plurality of independently-operating strippers or stripping-plates whereby very deep-flanged patterns may be molded without difficulty, and, second, to provide sprue-forming devices whereby clean-cut sprues or runners may be quickly formed in the cope portions of the molds while the sand-boxes are in the press, thus avoiding the necessity of forming sprues after the removal of the molds from the press or of finishing or blowing out partly-formed sprues or runners subsequent to the pressing operation.

Figure 1:
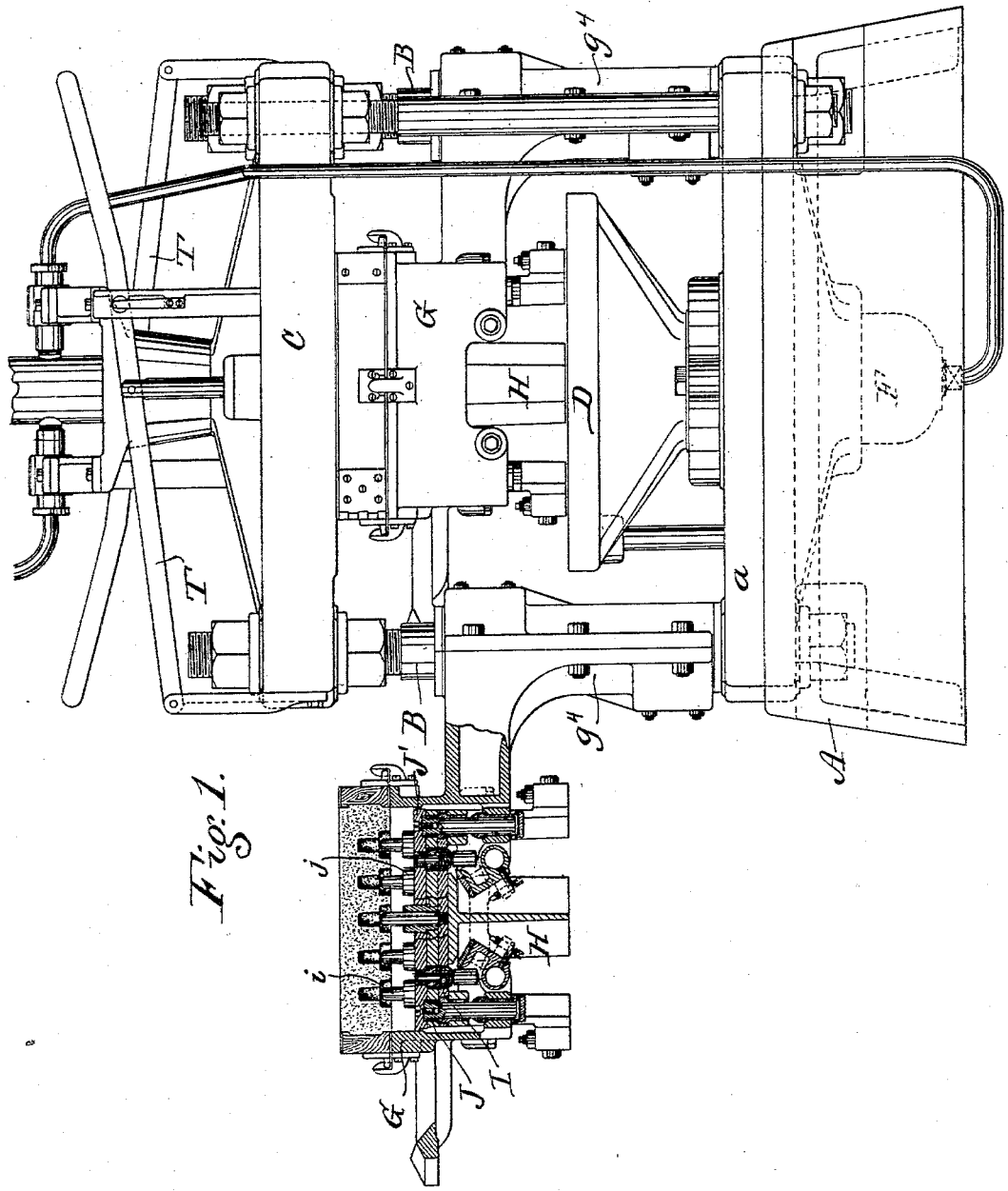
Figure 2:
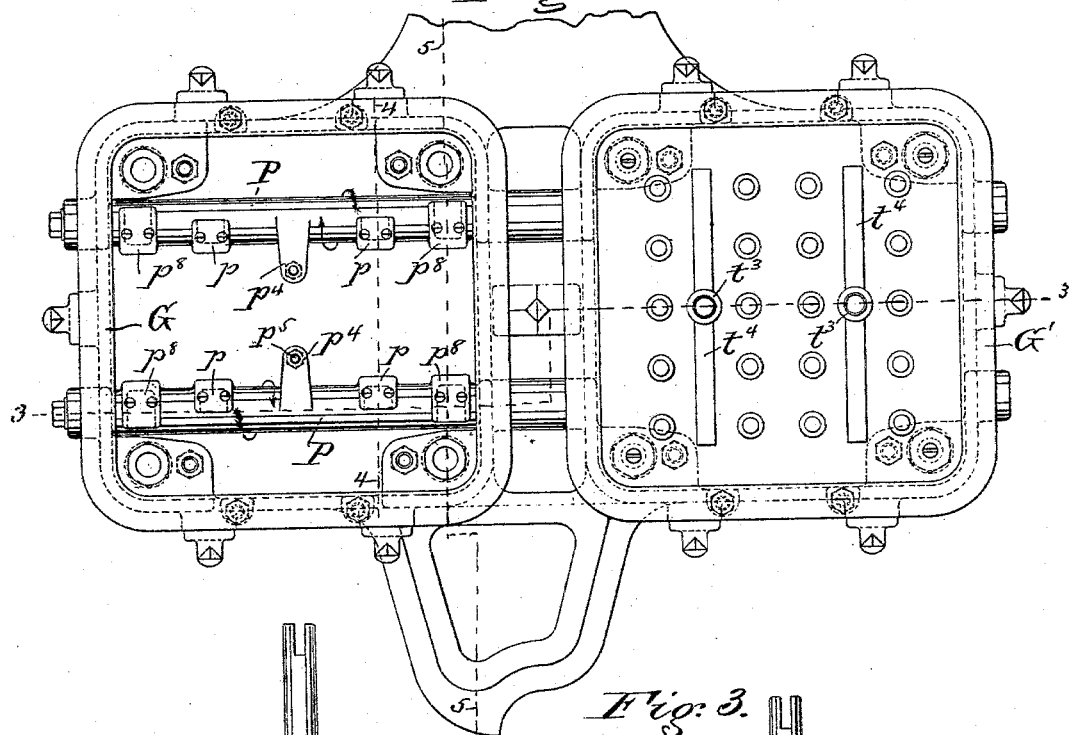
Figure 3:
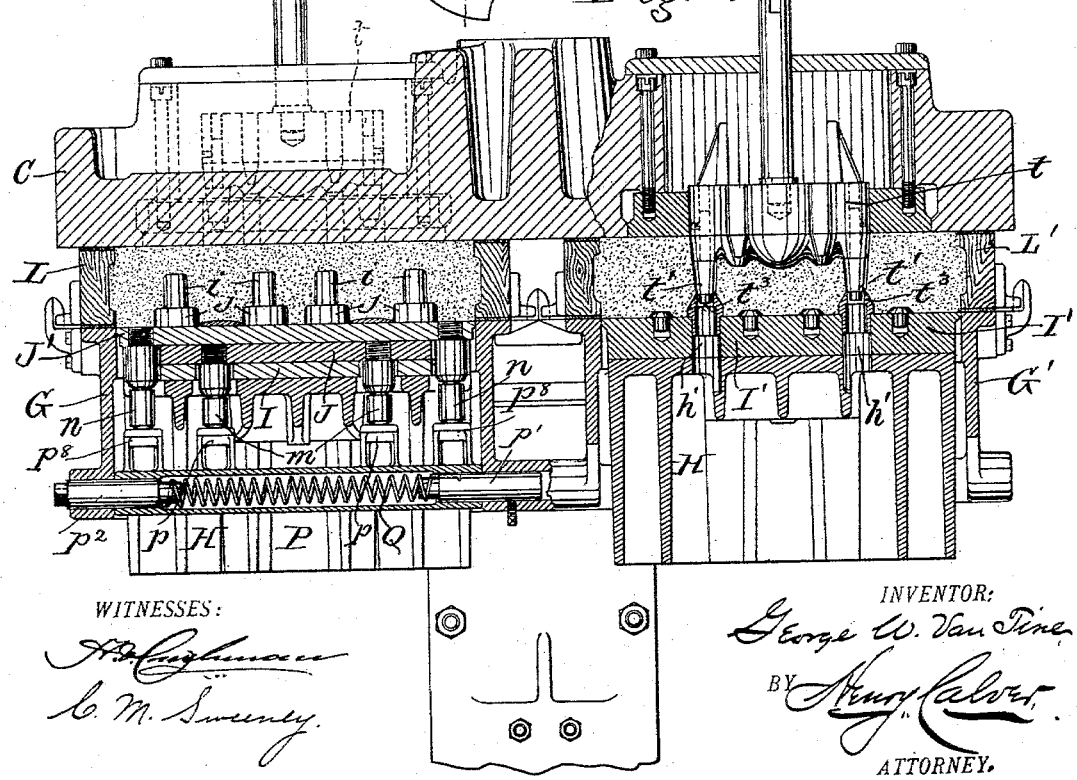
Figure 4:
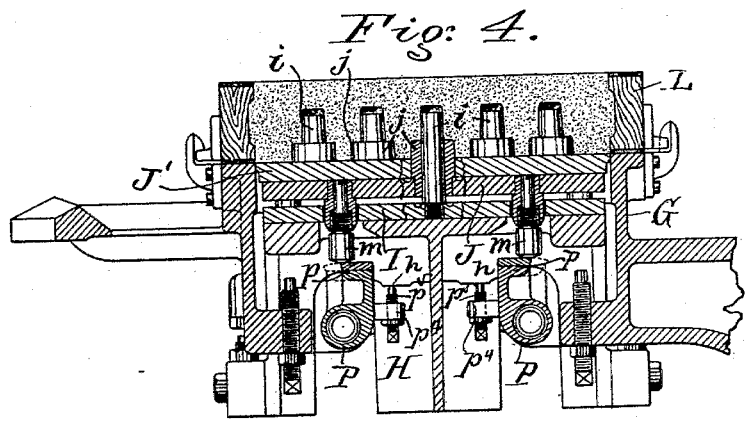
Figure 5:
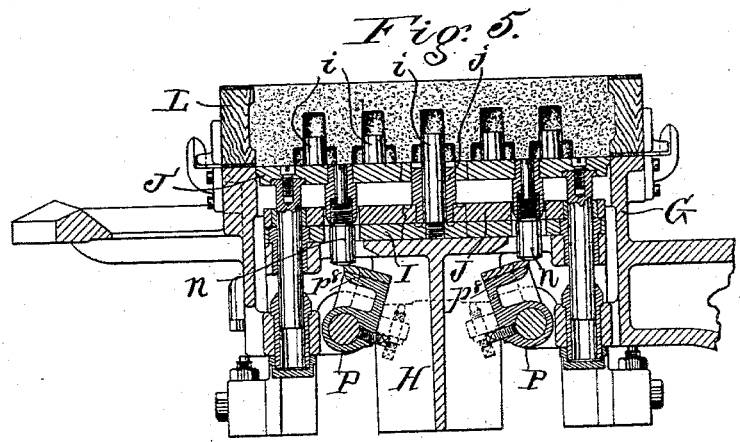

In the accompanying drawings, Figure 1 is a side elevation of a molding-press with my invention applied thereto and showing, in the sectional view of the sand-box at the left, the positions of the parts after the completion of the molding operation. Fig. 2 is a plan view of a double sand-box for forming the cope and drag portions of a mold, the pattern and stripping plates being omitted from the drag-forming part of the sand-box to show the armed rockers which coöperate with the stripping-plates to hold the latter elevated while the pattern-plate descends. Fig. 3 is a section of the double sand-box on line 3 3, Fig. 2, showing the parts in pressing position, and showing also the press-head in section and the sprue-forming device. Fig. 4 is a section on line 4 4 of Fig. 2, showing the pattern-plate partly lowered and both stripping-plates elevated; and Fig. 5 is a section on line 5 5 of Fig. 2, showing the pattern-plate and the first stripping-plate partly lowered and the second stripping-plate still elevated.

A denotes the base of the press, B the standards thereof, and C the press-head supported by said standards. Resting on the base A is a table $a$, which supports the ram-cylinder F, in which works a plunger carrying the platen D. The sand-boxes G G' are movable in and out of the press in any suitable manner, preferably by being connected with sleeves $g^4$, surrounding the standards B.

The press herein illustrated is provided with two sets of horizontally-swinging sand-boxes movable independently of each other, so that they may be alternately swung to filling and pressing positions. Each sand-box G is furnished with a skeleton press block or device H, vertically movable therein, and attached to said press-block to move therewith is a pattern-plate I, furnished with a pattern or patterns $i$. Resting on the pattern-plate I is the first stripping-plate J, which is also a partial pattern-plate in that it is provided with the pattern projections $j$, through which the patterns $i$ extend and which pattern projections $j$ make, in the mold, flange-forming recesses surrounding the mold impressions made by the patterns $i$.

J' is the upper or second stripping-plate placed above the first or lower stripping or stripping and pattern plate J, the patterns $i$ and $j$ projecting through the said second stripping-plate J' to form the mold.

Each sand-box G is provided with two hollow rockers P, provided with torsional springs Q, having a tendency to turn said rockers, as denoted by the arrows in Fig. 2, and, to this end, one end of each spring Q is connected to a fixed stud $p'$ and the other end to a stud $p^2$, connected to the rocker and free to turn in a suitable bearing in the sand-box. Each rocker P is furnished with short arms $p$, arranged to extend beneath studs $m$, depending from the first or lower stripping-plate J, and with slightly longer arms $p^3$, arranged to extend beneath studs $n$, depending from the upper or second stripping-plate J', and each of said rockers P has also an arm $p^4$, provided with an adjustable screw or projection $p^5$, to be engaged by the parts $h$, Fig. 4, of the press-block H as the latter descends after the pressing operation.

Thus, in the use of my invention, when a half-flask L has been placed on a sand-box G and the latter and the half-flask have been filled with sand, and the sand-box has been swung inward beneath the press-head, the upwardly-moving platen will raise the press-block H and the pattern and stripping plates supported thereby to force the sand into the half-flask L and thus form the mold. When the pattern and stripping plates are fully lifted at the pressing operation, the springs Q turn the rockers P, so that the arms $p$ and and $p^8$ pass beneath the studs $m$ and $n$ of the stripping-plates J J', said studs during the pressing operation being lifted above the tops of said arms. When the press-block H is lowered after the pressing operation, it first partly withdraws the patterns $i'$ (carried by the pattern-plate I, attached to or resting on said press-block) from the sand, while the stripping-plates J and J' are held elevated by the said arms $p$ and $p^8$. (See Figs. 4 and 5.) After the patterns $i$ have been partly withdrawn from the molds the parts $h$ of the press-blocks H engage the screws or projections $p^5$, carried by the arms $p^4$ of the rockers P, so as to turn said rockers to disengage the arms $p$ and $p^8$ from the studs $m$ and $n$ of the stripping-plates J and J', the shorter arms $p$ being first disengaged from the studs $m$ to permit the first stripping-plate J to descend, (see Fig. 5,) and then the continued movements of the rockers disengaging the longer arm $p^8$ from the studs $n$ of the second stripping-plate J' to permit the latter to descend to the position shown in Fig. 1. Thus by the use of a plurality of stripping-plates, (more than two may be employed, if desired,) which are successively withdrawn or lowered from the mold, I am enabled to successfully mold very deep-flanged patterns in a rapidly-operated molding-press.

To form (while the sand-boxes are in pressing position in the press) clean-cut sprues or runners in the cope portions of the molds which are impressed into the half-flasks L', placed on the sand-boxes G', I furnish the press-head C with vertically-movable sprue-formers $t$, operated by hand-levers T, said sprue-formers having tapering portions $t'$, arranged, when said sand-box is in pressing position, to register with hollow runner-forming projections $t^3$ on the pattern or gate plate I' and coöperating with the gates $t^4$ on said plate to produce suitable runners in the cope portions of the molds which are compressed or compacted into the half-flasks L', placed on the sand-boxes G'. The hollow projections $t^3$ register with openings $h'$, formed through the said pattern or gate plate I' and the table of the press-block H. Thus when the filled sand-box G' is in pressing position, but prior to the pressing operation, a hand-lever T is operated to depress a sprue-former $t$ into the sand, the reduced tapered lower ends $t'$ of said sprue-formers making clean impressions in the sand and forcing any superfluous or non-compacted sand downward through the hollow projections $t^3$ and openings $h'$, thus avoiding the necessity of blowing out the sprues or runners after the molds are removed from the press. When the press-block rises to compact the sand into the half-flask L', the sprue-former, which in the meantime has been left in the sand, is partly lifted by the pressing operation. The sprue-former (shown idle at the left in Fig. 3) is for use with the cope portion of the double sand-box working from the side of the press opposite to that occupied by the double sand-box shown in said figure.

Having thus described my invention, I claim and desire to secure by Letters Patent—

1. In a molding-press, the combination with a sand-box and a press-block and pattern-plate vertically movable in said box, of a plurality of superposed strippers or stripping-plates movable independently of each other and of said pattern-plate and which are to be moved upward with the latter at the pressing operation, and mechanism, operated by said press-block, whereby said strippers or stripping-plates are successively released so that they may be lowered independently of and one after the other, and independently of said pattern-plate.

2. The combination with a sand-box G, and strippers J and J' all vertically movable in said sand-box, said strippers having, respectively, the depending projections $m$ and $n$, of the spring-acted rockers P having arms $p$ and $p^8$, of different lengths, and having also the arms $p^5$ to be acted on by parts of the said press-block to operate said rockers in opposition to the action of their springs.

3. In a molding-press, the combination with a cope-forming sand-box, of a pattern or gate or runner forming plate vertically movable in said sand-box and provided with one or more openings and with one or more hollow projections above said openings; of a sprue-former supported by the press-head and vertically movable relative thereto and having one or more tapering portions arranged to register with said hollow projections and openings when the said sand-box is in pressing position in the press.

4. The combination with the press-head C, of the sprue-formers $t$ vertically movable relative thereto and having tapering portions $t'$, the operating hand-levers T for depressing or lifting said sprue-formers, and the sand-box G', of the press-block H and the plate I' both having openings $h'$ and the said plate having the hollow projections $t^3$ registering with said openings.

In testimony whereof I affix my signature in presence of two witnesses.

GEORGE W. VAN TINE.

Witnesses:
PHILIP DIEHL,
J. G. GREENE.